(12) United States Patent
Vernick et al.

(10) Patent No.: US 12,491,508 B2
(45) Date of Patent: Dec. 9, 2025

(54) SYSTEMS AND METHODS FOR DETERMINING PREVALENCE OF SARS-CoV-2 IN A POPULATION

(71) Applicant: THE STATE OF ISRAEL, MINISTRY OF AGRICULTURE & RURAL DEVELOPMENT, AGRICULTURAL RESEARCH ORGANIZATION (ARO) (VOLCANI CENTER), Rishon Lezion (IL)

(72) Inventors: Sefi Vernick, Tel-Aviv (IL); Roy Posmanik, Ramat David (IL)

(73) Assignee: THE STATE OF ISRAEL, MINISTRY OF AGRICULTURE & RURAL DEVELOPMENT, AGRICULTURAL RESEARCH ORGANIZATION (ARO) (VOLCANI CENTER), Rishon Lezion (IL)

( * ) Notice: Subject to any disclaimer, the term of this patent is extended or adjusted under 35 U.S.C. 154(b) by 519 days.

(21) Appl. No.: 17/917,250

(22) PCT Filed: Apr. 7, 2021

(86) PCT No.: PCT/IL2021/050401
§ 371 (c)(1),
(2) Date: Oct. 6, 2022

(87) PCT Pub. No.: WO2021/205454
PCT Pub. Date: Oct. 14, 2021

(65) Prior Publication Data
US 2023/0226538 A1    Jul. 20, 2023

Related U.S. Application Data

(60) Provisional application No. 63/006,739, filed on Apr. 8, 2020.

(51) Int. Cl.
*G01N 1/00* (2006.01)
*B01L 3/00* (2006.01)
(Continued)

(52) U.S. Cl.
CPC .......... *B01L 3/502* (2013.01); *G01N 33/5438* (2013.01); *G01N 33/56983* (2013.01);
(Continued)

(58) Field of Classification Search
None
See application file for complete search history.

(56) References Cited

FOREIGN PATENT DOCUMENTS

CN        104459065 A       3/2015
EP        3325153           3/2020
(Continued)

OTHER PUBLICATIONS

Research information sheet by WaterRA. Monitoring SARS-CoV-2 presence and persistence in Australian sewerage networks; Available at URL: https://www.waterra.com.au/research/open-rffs-andrfps/2020/monitoring-covid-19-vims-presence-and-persistence-in-the-australian-sewage-networks/ water RA (dated to Apr. 4, 2020 according to web archive: https://web.archive.org/web/20200404023909/https://www.waterra.com.au/research/open-rffs-and-rfps/2020/monitoringcovid-19vims-presence-and-persistence-in-the-australian-sewage-networks/).
(Continued)

*Primary Examiner* — Jyoti Nagpaul
(74) *Attorney, Agent, or Firm* — Mark S. Cohen; PEARL COHEN ZEDEK LATZER BARATZ LLP

(57) ABSTRACT

A system configured to determine the load in a liquid sample of predetermined antigens is provided. The system comprises a measurement chamber configured for receipt therein of the liquid sample, a sensor circuit, and an analysis unit. The sensor circuit comprises a plurality of working elec-
(Continued)

trodes, each comprising antibodies on its surface associated with one of the predetermined antigens, at least one reference electrode, and at least one counter electrode. Proximal ends of the electrodes are disposed on a reading zone of the sensor circuit, the reading zone being disposed within the measurement chamber. The analysis unit is configured to facilitate the determination of the load of each of the antigens by measuring electrical properties of the electrodes.

20 Claims, 3 Drawing Sheets

(51) Int. Cl.
    *G01N 33/543*     (2006.01)
    *G01N 33/569*     (2006.01)

(52) U.S. Cl.
    CPC .................. *B01L 2300/0645* (2013.01); *B01L 2300/0681* (2013.01); *B01L 2300/0867* (2013.01); *B01L 2300/087* (2013.01); *G01N 2469/10* (2013.01)

(56) References Cited

FOREIGN PATENT DOCUMENTS

| | | | |
|---|---|---|---|
| WO | WO 2004/061418 | | 7/2004 |
| WO | WO2012050645 | * | 4/2012 |
| WO | WO 2013/015822 | | 1/2013 |
| WO | WO 2014/144660 | | 9/2014 |
| WO | WO 2015/072186 | | 5/2015 |
| WO | WO 2018/090122 | | 5/2018 |
| WO | WO-2019/004438 A1 | | 1/2019 |

OTHER PUBLICATIONS

Azriel-Rosenfeld R, et al. human synthetic combinatorial library of Arrayable single chain antibodies based on shuffling in vivo formed CDRs into general framework regions. J. Mol. Biol. 2004, 335(1):177-192.

Bitton A, Nahary et al. Antibody Isolation From a Human Synthetic Combinatorial and Other Libraries of Single-Chain Antibodies. Methods Mol Biol. 2018;1701:349-363.

Campuzano S, et al. Molecular Biosensors for Electrochemical Detection of Infectious Pathogens in Liquid Biopsies: Current Trends and Challenges. Sensors (Basel). 2017;17(11):2533.

Chowdhury, A.D., et al. Electrical pulse-induced electrochemical biosensor for hepatitis E virus detection. Nat Commun 2019 10, 3737.

Gale, J. (2020). Dutch scientists find a novel coronavirus early-warning signal. Bloomberg News.

Gal-Tanamy M et al., In vitro selection of a neutralization-resistant hepatitis C virus escape mutant. Proc Natl Acad Sci U S A. Dec 9, 2008;105(49):19450-5.

Gal-Tanamy M, et al., HCV NS3 Serine Protease-Neutralizing Single-Chain Antibodies Isolated By a Novel Genetic Screen. J. Mol. Biol. 2005 347: 991-1003.

Hakim R, Benhar I. "Inclonals"; IgGs and IgG-enzyme fusion proteins produced in an *E. coli* expression refolding system. mAbs 2009 1(3):1-7.

Hellmér, M., et al., Detection of pathogenic viruses in sewage provided early warnings of hepatitis A virus and norovirus outbreaks. Applied and Environmental Microbiology,2014 80(21), 6771-6781.

Kaushik A, et al. A sensitive electrochemical immunosensor for label-free detection of Zika-virus protein. Sci Rep. 2018 8(1).

Layqah, L.A., et al. An electrochemical immunosensor for the corona virus associated with the Middle East respiratory syndrome using an array of gold nanoparticle-modified carbon electrodes. Microchim Acta, 2019 186, 224.

Mallapaty, Smriti, et al. How sewage could reveal true scale of coronavirus outbreak. Nature, 2020, 580.7802: 176-177.

Marisa Eisenberg et al., Oct. 19, 2018, Sewage surveillance is the next frontier in the fight against polio "Sewage surveillance is the next frontier in the fight against polio", https://theconversation.com/sewage-surveillance-is-the-next-frontier-in-the-fight-against-polio-105012.

National Institute for Public Health and the Environment, Mar. 24, 2020, "Novel coronavirus found in wastewater" https://www.rivm.nl/en/news/novel-coronavirus-found-in-wastewater.

Nicole Casal Moore, Mar. 26, 2020, Michigan News, University of Michigan, https://news.umich.edu/a-sewage-surveillance-effort-to-track-covid-19/.

Nidzworski, D., Siuzdak, K., Niedziałkowski, P. et al. A rapid-response ultrasensitive biosensor for influenza virus detection using antibody modified boron-doped diamond. Sci Rep 2017 7, 15707.

Saggy I, Wine Y, Shefet-Carasso L, Nahary L, Georgiou G, Benhar I. Antibody isolation from immunized animals: comparison of phage display and antibody discovery via V gene repertoire mining. Protein Engineering, Design & Selection 2012 25(10):539-49.

Vaisman-Mentesh A, Wine Y. Monitoring Phage Biopanning by Next-Generation Sequencing. Methods Mol Biol. 2018 1701:463-473.

Vernick S, et al., Colon Cancer Diagnosis by Multiple Biomarker Electrobiochemical Detection in Biopsy Slices. Gastroenterology 2012 142, S345.

Vernick S, et al., Electrostatic melting in a single-molecule field-effect transistor with applications in genomic identification. Nat Commun 2017 8, 15450.

Vernick S. et al., ElectrochemicalBiosensing for Direct Biopsy Slices Screening for Colorectal Cancer Detection. Journal of the Electrochemical Society 2011 158, p. 1-p. 4.

Walls AC, et al.. Structure, Function, and Antigenicity of the SARS-CoV-2 Spike Glycoprotein. Cell. Mar. 6, 2020. pii: S0092-8674(20)30262-2.

Wang, X. W., et al, SARS coronavirus in sewage from Xiao Tang Shan hospital and the 309th Hospital of the Chinese People's Liberation Army. Water Science and Technology, 2005 52(8), 213-221.

Wang, Xin Wei, et al., Concentration and detection of SARS coronavirus in sewage from Xiao Tang Shan Hospital and the 309th Hospital. Journal of Virological Methods, 2005 128(1-2), 156-161.

Wine Y. et al. Molecular deconvolution of the monoclonal antibodies that comprise the polyclonal serum response. Proc Natl Acad Sci USA 2013 110, 2993-2998.

* cited by examiner

SYSTEMS AND METHODS FOR DETERMINING PREVALENCE OF SARS-CoV-2 IN A POPULATION

CROSS-REFERENCE TO RELATED APPLICATIONS

This application is a National Phase Application of PCT International Application No. PCT/IL2021/050401, International Filing Date Apr. 7, 2021, and claims the benefit of U.S. Provisional Application No. 63/006,739 filed Apr. 8, 2020, both of which are incorporated herein by reference.

TECHNOLOGICAL FIELD

The presently disclosed subject matter relates to methods for determining the prevalence of SARS-CoV-2 in a population, and to systems for performing such methods.

BACKGROUND

In order to manage a pandemic or other outbreak, health authorities are aided by current information about the spread of the disease. While individually testing individuals may provide such information, obtaining data sets which are suitably representative of different locations, in particular multiple data sets for the same population over time, is generally impractical.

Wastewater based epidemiology is one method of obtaining location-specific information about the spread of the disease. Samples of wastewater are collected and tested for the presence and load of the pathogen. Based on this information, and accounting for the locations from which each of the samples were taken, authorities can obtain a broad picture of the spread of the disease without the need to perform tests on individuals.

SUMMARY

According to an aspect of the presently disclosed subject matter, there is provided a system configured to determine the load in a liquid sample of each of a plurality of predetermined antigens, at least one of the predetermined antigens being associated with a variant of SARS-CoV-2, the system comprising:
  a measurement chamber configured for receipt therein of the liquid sample, the measurement chamber being disposed between an inlet disposed upstream thereof and having a coarse filter, and an outlet disposed downstream thereof and having a fine filter, wherein the coarse filter allows passage of pathogens associated with the predetermined antigens therethrough, and the fine filter does not allow passage of pathogens associated with the predetermined antigens therethrough;
  a sensor circuit comprising a plurality of working electrodes, each comprising antibodies on its surface associated with one of the predetermined antigens, at least one reference electrode, and at least one counter electrode, proximal ends of the electrodes being disposed on a reading zone of the sensor circuit, the reading zone being disposed within the measurement chamber; and
  an analysis unit configured to facilitate the determination of the load of each of the antigens by measuring electrical properties of the electrodes.

It will be appreciated that herein the present description and appended claims, references to quantities of antigens (e.g., "a plurality of predetermined antigens") refer to quantities of types of antigens, and not to the number of individual molecules and/or molecular structures, unless otherwise clear from context.

The system may further comprise a mixing chamber upstream of the inlet, the mixing chamber being configured to receive therein the liquid sample for mixing with a buffer solution.

The mixing chamber may be configured for injection therein of the buffer solution.

The buffer solution may be a buffered saline solution.

The buffer solution may constitute a redox couple.

The analysis unit may be configured to measure the frequency response of the sensor circuit.

The analysis unit may comprise a potentiostat circuit.

The working electrodes may be made of gold.

Each of the reference electrodes may be uniquely associated with one of the working electrodes.

Each of the counter electrodes may be uniquely associated with one of the working electrodes.

At least some of the reference electrodes may be associated with a plurality of the working electrodes.

Working electrodes of the plurality associated with a single reference electrode may comprise the same antibodies as one another.

At least some of the counter electrodes may be associated with a plurality of the working electrodes. Working electrodes of the plurality associated with a single counter electrode may comprise the same antibodies as one another.

One or more of the predetermined antigens may comprise an S1 subunit of a SARS-CoV-2 peplomer.

One or more of the predetermined antigens may comprise an S2 subunit of a SARS-CoV-2 peplomer.

One or more of the predetermined antigens may be a whole-virus antigen.

The system may be further configured to determine the load in the liquid sample of one or more predetermined antigens being associated with a pathogen other than SARS-CoV-2.

At least two of the predetermined antigens may be associated with different variants of SARS-CoV-2.

According to another aspect of the presently disclosed subject matter, there is provided a system configured to determine the load in a liquid sample of each of a plurality of predetermined antigens, the system comprising:
  a measurement chamber configured for receipt therein of the liquid sample;
  a sensor circuit comprising a plurality of working electrodes, each comprising antibodies on its surface associated with one of the predetermined antigens, at least one reference electrode, and at least one counter electrode, proximal ends of the electrodes being disposed on a reading zone of the sensor circuit, the reading zone being disposed within the measurement chamber; and
  an analysis unit configured to facilitate the determination of the load of each of the antigens by measuring electrical properties of the electrodes.

The measurement chamber may be disposed between an inlet disposed upstream thereof and having a coarse filter, and an outlet disposed downstream thereof and having a fine filter, wherein the coarse filter allows passage of pathogens associated with the predetermined antigens therethrough, and the fine filter does not allow passage of pathogens associated with the predetermined antigens therethrough.

The system may further comprise a mixing chamber upstream of the inlet, the mixing chamber being configured to receive therein the liquid sample for mixing with a buffer solution.

The mixing chamber may be configured for injection therein of the buffer solution.

The buffer solution may be a buffered saline solution.

The buffer solution may constitute a redox couple.

The analysis unit may be configured to measure the frequency response of the sensor circuit.

The analysis unit may comprise a potentiostat circuit.

The working electrodes may be made of gold.

Each of the reference electrodes may be uniquely associated with one of the working electrodes.

Each of the counter electrodes may be uniquely associated with one of the working electrodes.

At least some of the reference electrodes may be associated with a plurality of the working electrodes.

Working electrodes of the plurality associated with a single reference electrode may comprise the same antibodies as one another.

At least some of the counter electrodes may be associated with a plurality of the working electrodes. Working electrodes of the plurality associated with a single counter electrode may comprise the same antibodies as one another.

One or more of the predetermined antigens may comprise an S1 subunit of a peplomer. According to some examples, the peplomer is a SARS-CoV-2 peplomer.

One or more of the predetermined antigens may comprise an S2 subunit of a peplomer. According to some examples, the peplomer is a SARS-CoV-2 peplomer.

One or more of the predetermined antigens may be a whole-virus antigen.

At least two of the plurality of predetermined antigens may be associated with different viruses.

At least two of the plurality of predetermined antigens may be associated with different variants of the same virus.

At least one of the predetermined antigens may be associated with a variant of SARS-CoV-2.

According to another aspect of the presently disclosed subject matter, there is provided a system configured to determine the load in a liquid sample of at least one predetermined antigen being associated with a variant of SARS-CoV-2, the system comprising:

a measurement chamber configured for receipt therein of the liquid sample;

a sensor circuit comprising a plurality of working electrodes, each comprising antibodies on its surface associated with one of the at least one predetermined antigens, at least one reference electrode, and at least one counter electrode, proximal ends of the electrodes being disposed on a reading zone of the sensor circuit, the reading zone being disposed within the measurement chamber; and an analysis unit configured to facilitate the determination of the load of each of the antigens by measuring electrical properties of the electrodes.

The measurement chamber may be disposed between an inlet disposed upstream thereof and having a coarse filter, and an outlet disposed downstream thereof and having a fine filter, wherein the coarse filter allows passage of pathogens associated with the predetermined antigens therethrough, and the fine filter does not allow passage of pathogens associated with the predetermined antigens therethrough.

The system may further comprise a mixing chamber upstream of the inlet, the mixing chamber being configured to receive therein the liquid sample for mixing with a buffer solution.

The mixing chamber may be configured for injection therein of the buffer solution.

The buffer solution may be a buffered saline solution.

The buffer solution may constitute a redox couple.

The analysis unit may be configured to measure the frequency response of the sensor circuit.

The analysis unit may comprise a potentiostat circuit.

The working electrodes may be made of gold.

Each of the reference electrodes may be uniquely associated with one of the working electrodes.

Each of the counter electrodes may be uniquely associated with one of the working electrodes.

At least some of the reference electrodes may be associated with a plurality of the working electrodes.

Working electrodes of the plurality associated with a single reference electrode may comprise the same antibodies as one another.

At least some of the counter electrodes may be associated with a plurality of the working electrodes. Working electrodes of the plurality associated with a single counter electrode may comprise the same antibodies as one another.

The predetermined antigen may comprise an S1 subunit of a SARS-CoV-2 peplomer.

The predetermined antigen may comprise an S2 subunit of a SARS-CoV-2 peplomer.

The predetermined antigen may be a whole-virus antigen.

The system may be configured to determine the load in the liquid sample of each of a plurality of predetermined antigens.

The system may be further configured to determine the load in the liquid sample of one or more predetermined antigens being associated with a pathogen other than SARS-CoV-2.

At least two of the predetermined antigens may be associated with different variants of SARS-CoV-2.

According to another aspect of the presently disclosed subject matter, there is provided a system configured to determine the load in a liquid sample of at least one predetermined antigen, the system comprising:

a measurement chamber configured for receipt therein of the liquid sample, the measurement chamber being disposed between an inlet disposed upstream thereof and having a coarse filter, and an outlet disposed downstream thereof and having a fine filter, wherein the coarse filter allows passage of pathogens associated with the predetermined antigens therethrough, and the fine filter does not allow passage of pathogens associated with the predetermined antigens therethrough;

a sensor circuit comprising a plurality of working electrodes, each comprising antibodies on its surface associated with one of the at least one predetermined antigens, at least one reference electrode, and at least one counter electrode, proximal ends of the electrodes being disposed on a reading zone of the sensor circuit, the reading zone being disposed within the measurement chamber; and an analysis unit configured to facilitate the determination of the load of each of the antigens by measuring electrical properties of the electrodes.

The system may further comprise a mixing chamber upstream of the inlet, the mixing chamber being configured to receive therein the liquid sample for mixing with a buffer solution.

The mixing chamber may be configured for injection therein of the buffer solution.

The buffer solution may be a buffered saline solution.

The buffer solution may constitute a redox couple.

The analysis unit may be configured to measure the frequency response of the sensor circuit.

The analysis unit may comprise a potentiostat circuit.

The working electrodes may be made of gold.

Each of the reference electrodes may be uniquely associated with one of the working electrodes.

Each of the counter electrodes may be uniquely associated with one of the working electrodes.

At least some of the reference electrodes may be associated with a plurality of the working electrodes.

Working electrodes of the plurality associated with a single reference electrode may comprise the same antibodies as one another.

At least some of the counter electrodes may be associated with a plurality of the working electrodes. Working electrodes of the plurality associated with a single counter electrode may comprise the same antibodies as one another.

One or more of the predetermined antigens may comprise an S1 subunit of a peplomer. According to some examples, the peplomer is a SARS-CoV-2 peplomer.

One or more of the predetermined antigens may comprise an S2 subunit of a peplomer. According to some examples, the peplomer is a SARS-CoV-2 peplomer.

One or more of the predetermined antigens may be a whole-virus antigen.

The system may be configured to determine the load in the liquid sample of each of a plurality of predetermined antigens.

At least two of the plurality of predetermined antigens may be associated with different viruses.

At least two of the plurality of predetermined antigens may be associated with different variants of the same virus.

At least one of the predetermined antigens may be associated with a variant of SARS-CoV-2.

According to another aspect of the presently disclosed subject matter, there is provided a method of monitoring the prevalence of SARS-CoV-2 in a population, the method comprising providing one or more systems according any of the above aspects, and performing a measurement comprising:

obtaining a liquid sample, from a predetermined location, of wastewater generated by at least a portion of the population;

determining, using the system, the load of one or more antigens associated with SARS-CoV-2 in the liquid sample; and relating the load of antigens to the prevalence of SARS-CoV-2 in the population.

The method may further comprise monitoring the prevalence of different strains of SARS-CoV-2.

The prevalence may be a relative prevalence.

The method may further comprise performing the measurement at a plurality of locations.

The method may further comprise performing the measurement a plurality of times at the same location.

The system may be configured to determine the load of one or more antigens autonomously.

The system may be configured to transmit information related to the determined load of antigens to a remote location.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1:
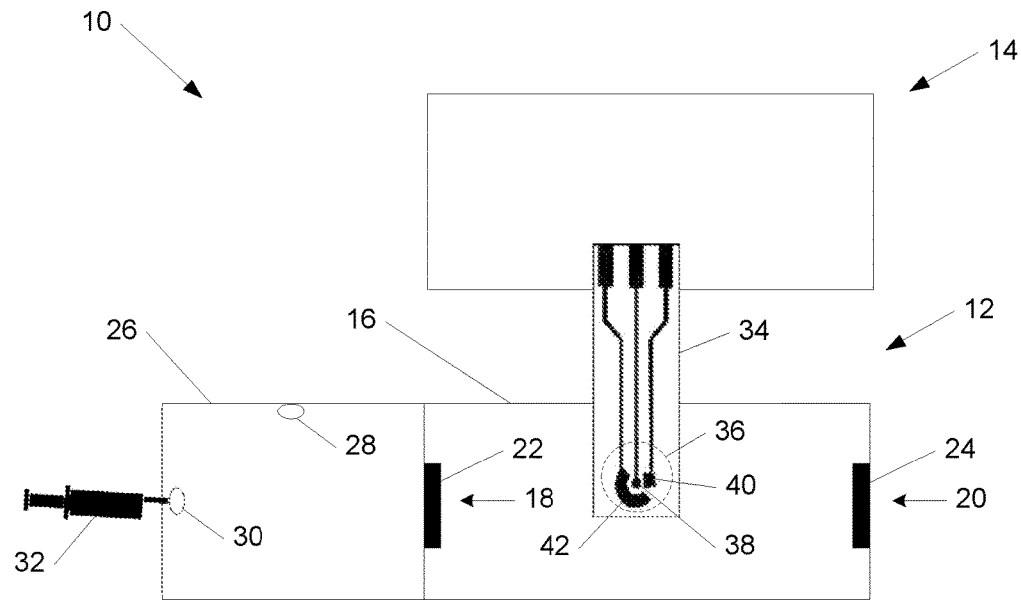
FIG. 1 schematically illustrates a system according to the presently disclosed subject matter for determining the load of SARS-CoV-2 in a liquid sample.

As illustrated in FIG. 1, there is provided a system, which is generally indicated at 10, configured for determining the load of a predetermined antigen or antigens, associated with severe acute respiratory syndrome coronavirus 2 (hereafter SARS-CoV-2) in a liquid sample. According to some examples, the antigen comprises at least a portion of the SARS-CoV-2 peplomer (i.e., spike protein), for example the S1 and/or the S2 subunits thereof. According to some examples, the antigen is a whole-virus antigen.

It will be appreciated that descriptions herein of determining the load of SARS-CoV-2 are presented as non-limiting examples, and that according to some examples the system 10 may be configured to determine the load of other viruses, e.g., in addition to the load of SARS-CoV-2. Accordingly, the system 10 according to the presently disclosed subject matter may be configured to determine the respective loads of each of a plurality of predetermined antigens in a single liquid sample, of which some or all are not associated with SARS-CoV-2. It will be further appreciated that descriptions herein to the system 10 determining the load of an antigen is for convenience only, and that such descriptions include, inter alia, determining respective loads each of a plurality of antigens, unless otherwise clear from context, mutatis mutandis.

The system 10 may be further configured to determine and/or facilitate determining the prevalence and/or rate of spread of SARS-CoV-2 and/or other pathogens in a community, for example based on measurements performed on wastewater in that community.

The system 10 comprises a sampling unit 12, configured to physically interact with the liquid sample, and an analysis unit 14. According to some examples, e.g., as will be further described hereinbelow, the sampling unit 12 is configured to be repeatedly and selectively mated and disconnected from the analysis unit 14, thereby allowing a single analysis unit to be mated with a plurality of sampling units, each in turn. According to other examples, the sampling unit 12 and analysis unit 14 are provided as a single integrated device.

The sampling unit 12 comprises a measurement chamber 16 configured for receipt therein of the liquid sample. According to some examples, the measurement chamber 16 is disposed between an inlet 18 for introduction therethrough of the liquid sample, and an outlet 20 for egress therethrough of liquid. In order to perform an initial refinement of the liquid sample, a coarse filter 22 rated for a size larger than the SARS-CoV-2 virion may be provided within the inlet 18, and a fine filter 24 rated for a size smaller than the SARS-CoV-2 virion may be provided at the outlet 20.

Estimates for the size of a SARS-CoV-2 virion range between 50-200 nm in diameter; accordingly, the coarse filter 22 may be a 300 nm rated filter, and the fine filter 24 may be a 50 nm rated filter. Thus, particles which owing to their size, are presumably too large to be a SARS-CoV-2 virion are prevented from entering the measurement chamber 16. In addition, of the particles in the measurement chamber 16, only those which owing to their size, are presumably too small to be a SARS-CoV-2 virion are permitted to leave the measurement chamber.

The sampling unit 12 may further comprise a mixing chamber 26 upstream of the inlet 18 of the measurement chamber 16. The mixing chamber is configured for receipt therein of the liquid sample via a sample inlet 28, and of a buffer solution through a buffer inlet 30. The inlet 18 of the measurement chamber 16 constitutes an outlet of the mixing chamber 26.

The buffer solution may be configured to dilute the liquid sample a predetermined degree. In addition, it may be a saline solution, for example constituting a redox couple.

The buffer solution may be isotonic to SARS-CoV-2 virions, for example to facilitate maintaining their integrity. The buffer solution may have a pH in the physiological range, e.g., having a pH between about 7.3 and about 7.5.

According to some examples, the buffer solution may be, but is not limited to, phosphate-buffered saline or a HEPES buffer solution.

According to some examples, the liquid sample is introduced on a swab (not illustrated) inserted through the sample inlet 28.

According to some examples, the buffer solution is provided through the buffer inlet 30 using a syringe 32. The pressure provided by the syringe 32 to inject the buffer solution into the mixing chamber 26 may concurrently force the buffer solution-liquid sample mixture into the measurement chamber 16 through its inlet 18.

The sampling unit 12 may further comprise one or more sensor circuits 34, each with a reading zone 36 thereof disposed within the measurement chamber 16, thereby facilitating measurement thereby of the liquid sample.

Each sensor circuit 34 comprises one or more working electrodes 38, each comprising (e.g., being biofunctionalized with) antibodies for SARS-CoV-2, as will be further discussed below. Each working electrode 38 may comprise antibodies for a single variant, for multiple variants (e.g., as below) of SARS-CoV-2, and/or for one or more SARS-CoV-2 variants and at least one other pathogen. According to some examples, the antibodies comprise monoclonal antibodies (mAb's) and/or polyclonal antibodies. The working electrode may be made of gold.

The sensor circuit 34 further comprises one or more reference electrodes 40, each associated with one or more of the working electrodes 38. The sensor circuit 34 further comprises one or more counter electrodes 42, each associated with one or more of the working electrodes 38. A proximal end of each of the electrodes 38, 40, 42 extends into the reading zone 36.

Figure 2:
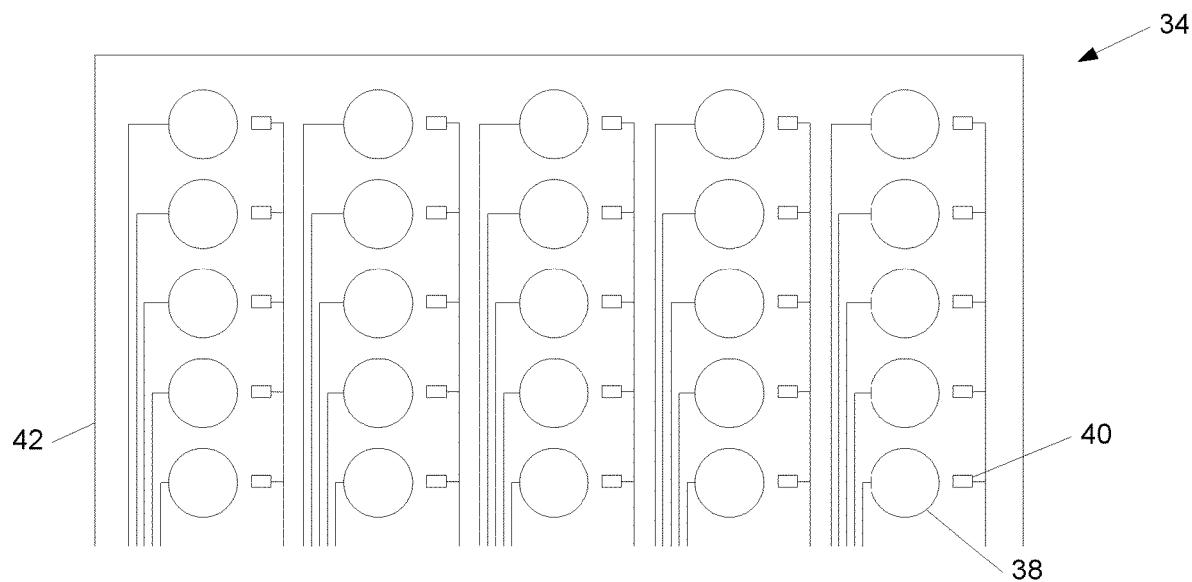
FIG. 2 schematically illustrates a portion of a reading zone of a sensor circuit according to some examples of the system illustrated in FIG. 1.

According to other examples, for example as illustrated in FIG. 2, each sensor circuit 34 comprises a plurality of working electrodes 38, one or more reference electrodes 40, and one or more counter electrodes 42. All of the working electrodes 38 in a single sensor circuit 34 may comprise antibodies for the same variant of SARS-CoV-2. According to some modifications, a single circuit may comprise a plurality of working electrodes 38, at least some of which comprise antibodies for a variant different than that of other working electrodes, e.g., some working electrodes may comprise antibodies for the B.1.1.7 lineage (per the PANGO nomenclature; commonly referred to as "the UK variant"), some working electrodes in the same sensor circuit 34 may comprise antibodies for the B.1.351 lineage (commonly referred to as "the South Africa variant"), some working electrodes in the sensor circuit may comprise antibodies of the P.1 lineage (commonly referred to as "the Brazil variant"), etc.

According to further modifications, some individual working electrodes 38 may comprise a mixture of antibodies for different variants of SARS-CoV-2, and different working electrodes in the same sensor circuit 34 may comprise different combinations thereof.

According to some examples, each reference electrode 40 is uniquely associated with a corresponding one of the working electrodes 38, i.e., there is a one-to-one relationship between working and reference electrodes.

According to other examples, at least some of the reference electrodes 40 are associated with a plurality of working electrodes 38. In this case, electrical properties of the working electrodes 38 associated with a single reference electrode may be measured (for example as described below) simultaneously using the same electrical parameters, or simultaneously. According to some modifications, all of the working electrodes associated with a single reference electrode 40 are similarly biofunctionalized, i.e., they comprise antibodies which correspond to the same antigens as the other working electrodes associated with the same reference electrode.

According to some examples, a single counter electrode 42 is associated with several or all of the working electrodes 38; according to other examples, each counter electrode is uniquely associated with one of the working electrodes.

According to some examples, the sensor circuit 34 comprises a single working electrode 38 and a single reference electrode 40.

Providing the antibodies on the working electrodes 38 may be accomplished by any suitable method, some of which are known in the art. It may be accomplished via covalent immobilization of the SARS-CoV-2 capsid-specific mAb's.

According to some examples, the sensitivity of the sensor circuit 34 is calibrated, for example by designing a dosing strategy, e.g., using a model system known in the art. SARS-CoV-2 capsid-specific mAb's may be used as the biorecognition element. mAb's integrated onto the working electrode 38 may then be validated for the detection of a model virus pseudo-typed with spike protein or any other Sars-CoV-2 antigen, e.g., a SARS-CoV-2 spike protein-pseudo-typed Vesicular stomatitis virus (VSV) and/or real sample. According to some examples, pVSV-AG-GFP plasmid may be transfected with plasmids encoding the VSV nucleocapsid (N), phosphoprotein (P), and large polymerase subunit (L), together with plasmid encoding the SARS-CoV-2 peplomer.

According to some examples, various lentivirus vectors pseudo-typed with SARS-CoV-2 spike protein may be used as a model. In a different example, a pseudo-typed virus model with the SARS-CoV-2 infection property can be developed, based on the HIV-1 backbone consisting of an S expression plasmid and the HIV-1 packaging system incorporating luciferase reporter genes.

The mAb's may be obtained from a commercial source, and/or may be produced, e.g., using phage bio-panning with naïve human and immunized mice single-chain fragment variable (scFv) libraries, for example as is well-known in the art. High throughput sequencing may be employed to enhance mAb discovery throughout phage selection cycles.

The analysis unit 14 is configured to measure electrical properties of each of the sensor circuits 26. According to some examples, for example as illustrated in FIG. 3, the analysis unit 14 may comprise a potentiostat circuit 44, connected to distal ends of each of the electrodes 38, 40, 42.

As mentioned above, the sampling unit 12 may be configured to be repeatedly and selectively mated and disconnected from the analysis unit 14, thereby allowing a single analysis unit to be mated with a plurality of sampling units, each in turn. According to some examples, the analysis unit 14 comprises a connector, for example per the Universal Serial Bus (USB) standard, with distal ends of the electrodes 38, 40, 42 being formed as or in electrical contact with a connector formed to mate with the connector of the analysis unit. According to some modifications, the analysis unit 14 in configured to pair with a portable computing device, for example a smartphone, to facilitate analysis, for example as described below.

The potentiostat circuit 44 comprises an input source 46 configured to provide an electrical current at a constant voltage, an electrometer 48 configured to measure the voltage difference between the working and reference electrodes 38, 40, a current-to-voltage (I/E) converter 50 configured to measure the current of the electrochemical cell realized when the reading zone 36 of the sensor circuit 34 is submerged within the liquid sample, and a control amplifier 52 configured to maintain the voltage between the working and reference electrodes, by adjusting its output. As potentiostats are well-known, one having ordinary skill in the art will be able to implement and operate the potentiostat circuit 44.

Figure 3:
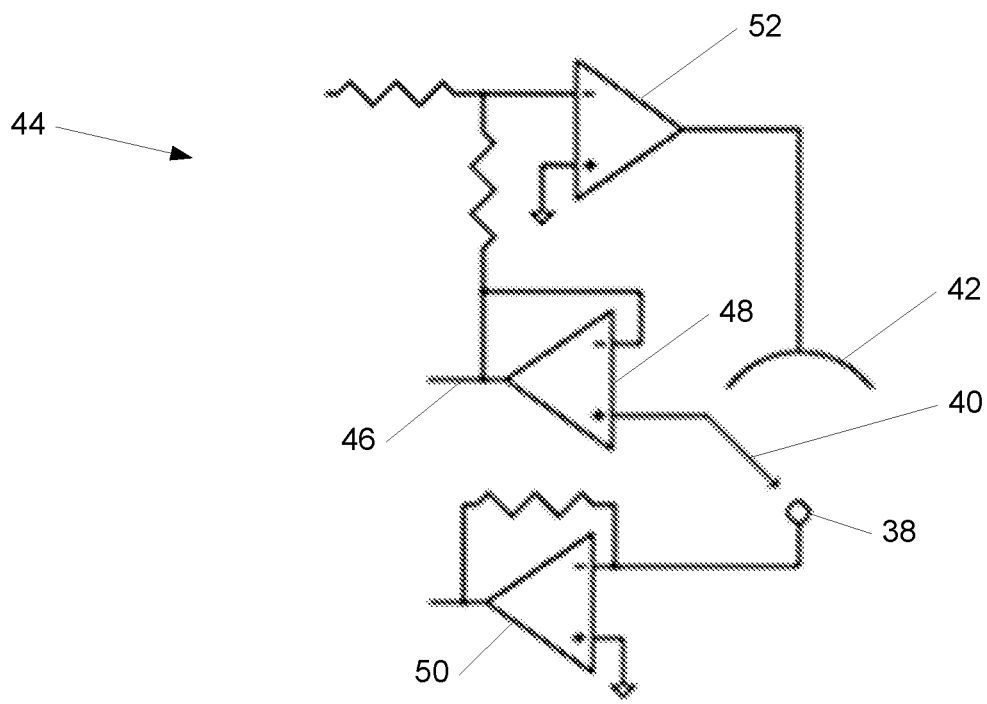
FIG. 3 schematically illustrates a potentiostat circuit according to some examples of the system illustrated in FIG. 1.

It will be appreciated that the potentiostat circuit 44 described above with reference to and as illustrated in FIG. 3 is provided as a non-limiting example only, and one having skill in the art will recognize that other circuit designs may be employed in place thereof in order to realize the required measurement.

In use, when, e.g., pathogens carrying the target antigen come in contact with the working electrode 38, they bind to them, thereby causing an impedance change of the sensor circuit 34. As the impedance change varies with the amount of pathogens which have bound to the proximal end of the working electrode 38, the change in impedance can be correlated with the antigen load in the liquid sample.

Accordingly, the analysis unit 14 may be configured to measure the frequency response of the sensor circuit 34 after it has been exposed to the liquid sample for a predetermined amount of time. According to some examples, the predetermined amount of time is about ten minutes.

Figure 4:
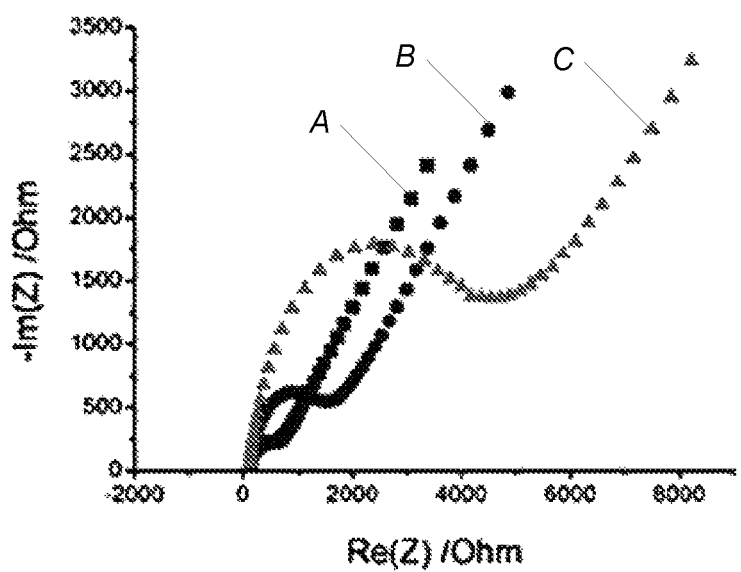
FIG. 4 is an example of Nyquist plot representing the frequency response of a working electrode of the system illustrated in FIG. 1.

The analysis unit 14 may be configured to perform faradaic electrochemical impedance spectroscopy, for example as is well-known in the art, on the sensor circuit 34 when exposed to the liquid sample and to the redox couple in the buffer solution. A Nyquist plot (for example as illustrated in FIG. 4) may be used to visually represent real ($Z_{real}$) and imaginary ($Z_{imag}$) components of the impedance of the sensor circuit 34 at different frequencies.

Curve A (delineated by squares in FIG. 4) represents the frequency response of the sensor circuit 34 in which the working electrode 38 does not comprise any antibodies. Curve B (delineated by circles in FIG. 4) represents the frequency response of the sensor circuit 34 in which the working electrode 38 has been biofunctionalized with antibodies. Curve C (delineated by triangles in FIG. 4) represents the frequency response of the sensor circuit 34 in which the working electrode 38 has been biofunctionalized with antibodies and has been exposed to a liquid sample with a known load of antigens. Similar curves may be used to calibrate the analysis unit, so that the antigen load of an unknown liquid sample may be accurately measured.

An equivalent electronic circuit, for example a Randles circuit, may be used to model the data obtained from the electrochemical impedance spectroscopy, for example as is well-known in the art.

Figure 5:
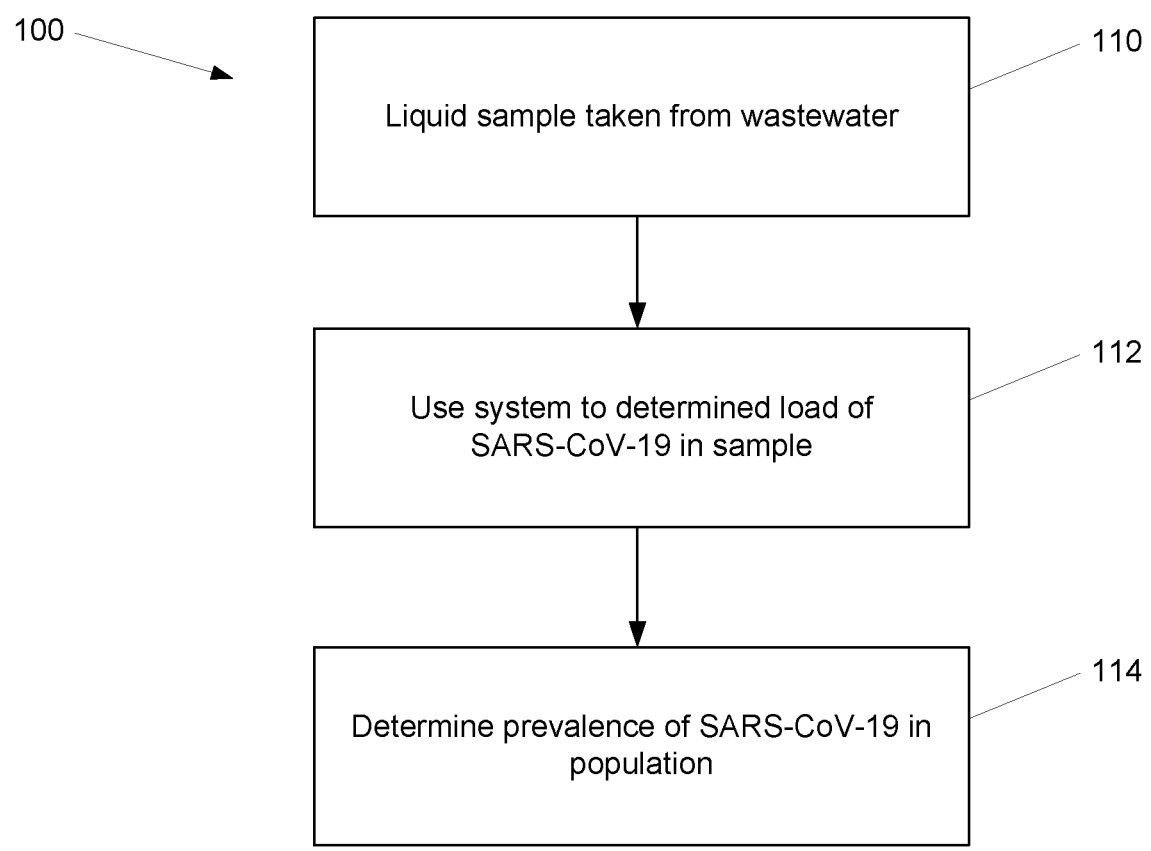
FIG. 5 illustrates a method of monitoring the prevalence of SARS-CoV-2 in a population.

As illustrated in FIG. 5, a method 100 may be provided to utilize the system 10 as described above with reference to and as illustrated in FIGS. 1 through 4, to monitor the prevalence of SARS-CoV-2 in a population. The prevalence measured may be a relative prevalence, e.g., how much greater/lower the prevalence of SARS-CoV-2 is in one area of the population compared to another, how much greater/lower the prevalence of SARS-CoV-2 is compared to an earlier time, etc.

In step 110 of the method, a liquid sample is taken from wastewater which has been generated by at least a portion of the population, at a predetermined location which is associated with that portion of the population. According to some examples, the predetermined location is a branch of a wastewater collection system which serves only the relevant portion of the population. According to other examples, the predetermined location is a wastewater treatment plant. It will be appreciated that liquid samples may be taken from multiple locations in a wastewater collection system, in order to obtain detailed information about a population.

In step 112 of the method, the system 10 is used to determine the load of SARS-CoV-2 antigens in the liquid sample taken at each location.

According to some examples, obtaining the samples is performed manually. Accordingly, a user may obtain the sample, for example on a swab, and insert it into the mixing chamber 26 of the system 10. A suitable buffer solution may be injected, for example as described above. The buffer solution mixes with the liquid sample in the mixing chamber 26, and enters the measurement chamber 16. After a suitable amount of time has elapsed, for example between about 10 minutes and about 30 minutes, the electrical properties of the working electrodes 38 of the system 10 are measured, for example as described above. In this way the load of one or more antigens in the liquid sample may be determined.

According to some examples, the system 10 is configured to perform the measurements autonomously. According to further examples, the system 10 is configured to transmit information related to the determined load of antigens to a remote location. This information may comprise the determined loads, and/or the data read directly from the electrodes, so that the final determination may be performed at a remote location, for example taking into account other readings which were performed, e.g., simultaneously at other locations, at the same location at other times, etc.

In step 114 of the method, the prevalence of SARS-CoV-2 in the population is determined, based at least partially on the loads which were determined in step 112. This may be done using in any suitable way, for example using one or more mathematical techniques which are well-known in the art.

It will be recognized that examples, embodiments, modifications, options, etc., described herein are to be construed as inclusive and non-limiting, i.e., two or more examples, etc., described separately herein are not to be construed as being mutually exclusive of one another or in any other way limiting, unless such is explicitly stated and/or is otherwise clear. Those skilled in the art to which this invention pertains will readily appreciate that numerous changes, variations, and modifications can be made without departing from the scope of the presently disclosed subject matter, mutatis mutandis.

The invention claimed is:

1. A system configured to determine the load in a liquid sample of each of a plurality of predetermined antigens, the system comprising:
 a measurement chamber configured for receipt therein of the liquid sample, said measurement chamber being disposed between an inlet disposed upstream thereof and having a coarse filter, and an outlet disposed downstream thereof and having a fine filter, wherein said coarse filter allows passage of pathogens associated with the predetermined antigens therethrough, and said fine filter does not allow passage of pathogens associated with the predetermined antigens therethrough;
 a sensor circuit comprising a plurality of working electrodes, each comprising antibodies on its surface associated with one of the predetermined antigens, at least one reference electrode, and at least one counter electrode, proximal ends of said electrodes being disposed on a reading zone of the sensor circuit, said reading zone being disposed within the measurement chamber; and
 an analysis unit configured to facilitate the determination of the load of each of said antigens by measuring electrical properties of the electrodes.

2. The system according to claim 1, further comprising a mixing chamber upstream of the inlet, said mixing chamber being configured to receive therein said liquid sample for mixing with a buffer solution.

3. The system according to claim 2, wherein said mixing chamber is configured for injection therein of the buffer solution.

4. The system according to claim 1, wherein the analysis unit is configured to measure the frequency response of the sensor circuit.

5. The system according to claim 1, wherein the analysis unit comprises a potentiostat circuit.

6. The system according to claim 1, wherein said working electrodes are made of gold.

7. The system according to claim 1, wherein each of the reference electrodes is uniquely associated with one of said working electrodes.

8. The system according to claim 1, wherein each of the counter electrodes is uniquely associated with one of the working electrodes.

9. The system according to claim 1, wherein at least some of said reference electrodes are associated with a plurality of said working electrodes.

10. The system according to claim 9, wherein working electrodes of the plurality associated with a single reference electrode comprise the same antibodies as one another.

11. The system according to claim 1, wherein at least some of said counter electrodes are associated with a plurality of said working electrodes.

12. The system according to claim 11, wherein working electrodes of the plurality associated with a single counter electrode comprise the same antibodies as one another.

13. The system according to claim 1, wherein at least one of the predetermined antigens is associated with a variant of SARS-COV-2.

14. The system according to claim 13, wherein one or more of said predetermined antigens comprises an S1 and/or an S2 subunit of a SARS-COV-2 peplomer.

15. The system according to claim 13, wherein at least two of the predetermined antigens are associated with different variants of SARS-COV-2.

16. The system according to claim 1, wherein one or more of said predetermined antigens is a whole-virus antigen.

17. A method of monitoring the prevalence of a pathogen in a population, the method comprising providing one or more systems according to claim 1, and performing a measurement comprising:
 obtaining a liquid sample, from a predetermined location, of wastewater generated by at least a portion of the population;
 determining, using the system, the load of one or more antigens associated with the pathogen in the liquid sample; and
 relating the load of antigens to the prevalence of in the population.

18. The method according to claim 17, wherein the pathogen is associated with SARS-COV-2.

19. The method according to claim 17, wherein the prevalence is a relative prevalence.

20. The method according to claim 17, said system being configured to determine the load of one or more antigens autonomously.

* * * * *